United States Patent [19]

Kaneko et al.

[11] Patent Number: 5,305,460
[45] Date of Patent: Apr. 19, 1994

[54] DATA PROCESSOR

[75] Inventors: Susumu Kaneko, Kodaira; Keiichi Kurakazu, Tachikawa, both of Japan

[73] Assignee: Hitachi, Ltd., Tokyo, Japan

[21] Appl. No.: 254,267

[22] Filed: Oct. 5, 1988

[30] Foreign Application Priority Data

Oct. 9, 1987 [JP] Japan ..................... 255180

[51] Int. Cl.⁵ .................... G06F 9/00; G06F 12/14
[52] U.S. Cl. ........................... 395/775; 364/DIG. 1;
364/232.8; 364/232.9; 364/245.7; 364/245.8;
364/246.9
[58] Field of Search ... 364/200 MS File, 900 MS File;
395/775, 575, 425

[56] References Cited

U.S. PATENT DOCUMENTS

| Re. 28,109 | 8/1974 | Provenzano et al. | 364/900 |
|---|---|---|---|
| 3,828,327 | 8/1974 | Berglund et al. | 364/200 |
| 4,393,459 | 7/1983 | Huntley et al. | 364/900 |
| 4,519,032 | 5/1985 | Mendell | 395/725 |
| 4,628,448 | 12/1986 | Murao | 364/200 |
| 4,783,731 | 11/1988 | Miyazaki et al. | 364/200 |
| 4,825,358 | 4/1989 | Letwin | 364/200 |
| 4,887,204 | 12/1989 | Johnson et al. | 364/200 |

OTHER PUBLICATIONS

"HMCS 68000 Hitachi Microcomputer System HD68000, HD68000Y, HD68000P, HD68000PS Micro Processing Unit (MPU)", Sep. 1984, p. 52.
"MC68020 32-Bit Microprocessor User's Manual", Motorola Inc., Second Edition, Prentice-Hall Inc., 1985, pp. 1-1, 1-2, 1-4, 6-1, 6-2, and 6-3.
Borivoje Furht, et al., "A Survey of Microprocessor Architecture for Memory Management", Computer, vol. 20, No. 3, Mar. 1987, pp. 48–67.
"Protection Scheme for Non-Key Storage Systems", IBM Technical Disclosure Bulletin, vol. 28, No. 10, Mar. 1986, pp. 4538–4539.

Primary Examiner—Debra A. Chun
Attorney, Agent, or Firm—Fay, Sharpe, Beall, Fagan, Minnich & McKee

[57] ABSTRACT

In a microcomputer having two program execution states including a supervisor state and a user state, there is disposed a flag or a register having such a flag indicating whether or not a RAM area used in the supervisor state can be used in the user state by the CPU. A judge circuit determines whether or not the CPU has made an attempt to invalidly access the RAM in the user state based on the content of the flag or the register and that of the supervisor/user state specify bit in the status register. In a case of an occurrence of an access violation, a violation signal is sent to the CPU and the selection signal of the RAM is disabled (to be set to an ineffective state), thereby increasing the reliability of the system.

30 Claims, 4 Drawing Sheets

DATA PROCESSOR

BACKGROUND OF THE INVENTION

The present invention relates to a data processing technology, and in particular, to a technology that is particularly effective when applied to a data processor having a higher operation mode and a lower operation mode, for example, to a technology effectively applied to a control method of a memory in a microcomputer.

Conventionally, a processor may have two program execution states, an operation mode called a supervisor state and an operation mode called a user state, where the processor is capable of operating either of the two states. For example, microprocessors similar to the 16-bit microprocessor HD68000 of Hitachi Ltd. operate in this manner. (For details refer to page 52 of the "HMCS 68000 Hitachi Microcomputer System HD68000, HD68000Y, HD6800PHD, HD68000PS Micro Processing Unit (MPU)".)

The supervisor state is a higher state of the processor program execution states and the central processing unit (CPU) can use any instructions and can access any registers in this state. The user state is a lower state of the program execution states and the CPU is not allowed to use the instructions and registers which greatly affect the system in this state. Namely, in the supervisor state, the CPU can execute a predetermined instruction which the CPU cannot execute in the user state.

As described above, with the provision of two program execution states, the microprocessor can more efficiently execute a multitask processing and the like.

Incidentally, in microcomputers having the two program execution states as described above, a bit is ordinarily disposed in a status register of the CPU for the purpose of indicating whether the processor is in the supervisor state or the user state. This would be used to indicate the current program execution state.

However, in the case where for example, a data access device such as a RAM is integrated in a microprocessor having the two program execution states, the following problem may arise. Where a CPU uses the integrated RAM as the data area while in the supervisor state, it is feared that in some cases important data may be destroyed if the CPU mistakenly accesses this data area while in the user state.

SUMMARY OF THE INVENTION

It is therefore an object of the present invention to prevent a microcomputer having two program execution states, which includes the supervisor state and the user state, an invalid access to, for example, a RAM area used in the supervisor state. This prevents the RAM from being mistakenly affected and prevents the destruction of important data, thereby improving the reliability of the system.

The representative features of the present invention disclosed in this specification are as follows.

Disposed in the processor is a flag or a register to indicate whether or not a RAM area used by the CPU in the supervisor state is to be accessed in the user state. Also disposed is a judge circuit and based on the content of the flag or register and on the content of the bit indicating the supervisor/user state in a status register, the judge circuit determines whether or not the CPU has effected an invalid access to the RAM in the user state. In a case of an access violation, a violation signal is sent to the CPU and a selection signal of the RAM is disabled (is set to the invalid state).

According to the means above, in a case where it is desired that the CPU uses the RAM in the supervisor state in order to keep the data protected in the RAM, a state preventing an access is set to the new flag or register thus disposed. This automatically prevents an access to the associated RAM in the user state so as to prevent destruction or a read operation of important data; or, so that a restoration of data destroyed by an exception processing or the like is enabled, thereby achieving the objects above to improve the reliability of the system.

Above and other objects and novel features of the present invention will become apparent from the following detailed description taken in conjunction with the accompanying drawings.

DESCRIPTION OF THE PREFERRED EMBODIMENTS

Figure 1:
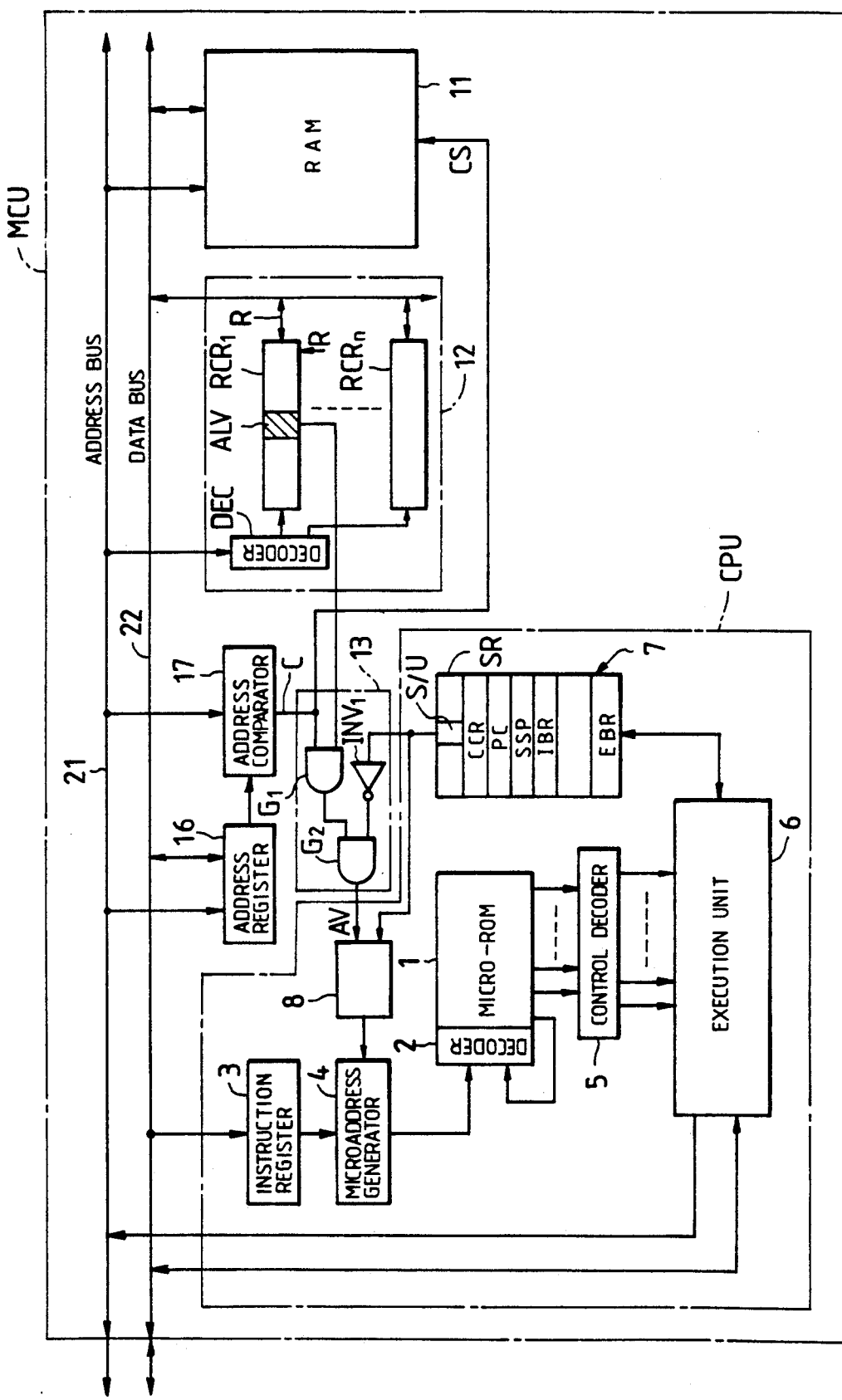
FIG. 1 is a block diagram schematically showing a first embodiment in a case where the present invention is applied to a microprocessor.

FIG. 1 shows an embodiment in which the present invention is applied to a microprocessor having an integrated RAM.

Although not particularly limited to, each circuit block enclosed with dot-and-dash lines in FIG. 1 is formed on a single semiconductor chip such as a monocrystalline silicon substrate.

The microprocessor of this embodiment is provided with a central processing unit (CPU) operating according to the microprogram control method. The central processing unit has a micro read only memory (ROM) 1 in which a microprogram is stored and the micro ROM is accessed from a microaddress decoder 2 so as to sequentially read out microinstructions constituting the microprogram.

The microaddress decoder 2 is supplied with an address signal generated by a microaddress generate circuit 4 based on an operation code of a microinstruction fetched into an instruction register 3, and when the address signal is decoded, a first instruction is read out of a group of microinstructions in a sequence executing the macro instruction. Of this group of microinstructions corresponding in sequence to the macroinstruction, the second and subsequent microinstructions are read out, based upon the next address from the previous microinstruction and the address supplied from the microaddress generate circuit 4 occurring when a code of the next address field of the previously read out microinstruction is supplied to the microaddress decoder 2. The microinstructions thus read out are then decoded by a control decoder 5, thereby generating control signals for an execution unit 6 and the like including various registers and an arithmetic logic unit (ALU).

In the CPU, there is disposed a group 7 of control registers including a status register SR indicating the internal control state, a condition code register CCR, program counter PC, a system stack pointer SSP, and I/O base register IBR enabling a group of the control registers above to be reallocatable in the address space of the CPU, an exception vector base register EBR for establishing relocatability of a vector for an exception processing in the CPU address space, and the like.

Moreover, an integrated RAM 11 is used as work areas of the CPU including a temporary storage area of data and a stack area. A memory control circuit 12 is formed on the same chip for providing a refresh control, a chip selection control, and a wait state control. These circuits and the CPU are connected to each other via an address bus 21 and a data bus 22.

In the microcomputer of this embodiment, there is disposed an address setting register 16 for setting an address space in which the integrated RAM 11 is to be allocated. An address compare circuit 17 compares an address on the address bus 21 with an address set to the address setting register 16 so as to determine whether or not the address generated by the CPU is to be used to access the integrated RAM. Also provided is an access level judge circuit 13 comprising an AND gate $G_1$ and an AND gate $G_2$. The input signals of the AND gate $G_1$ include a coincidence signal C outputted from the address compare circuit 17. Input signals to the AND gate $G_2$ include a signal obtained by inverting through an invertor $INV_1$ a state signal of the bit S/U indicating the supervisor/user state of the status register SR in the CPU and an output signal from the AND gate $G_1$. Incidentally, "0" of the bit S/U indicates the user state, whereas "1" indicates the supervisor state. In addition, the coincidence signal C delivered from the address compare circuit 17 is supplied as a selection signal CS for selecting the integrated RAM 11.

In addition, although not particularly limited to, there is disposed in the memory control circuit 12 a plurality of control registers $RCR_1$ to $RCR_n$ including a bank mode register and a refresh control register each supplied with an address. Of these registers, a bit of the register $RCR_1$ accessible only in the supervisor state is employed as a bit ALV indicating whether or not the integrated RAM is accessible in the user state. The state signal of this bit ALV is supplied to the other input terminal of the AND gate $G_1$ constituting the access level judge circuit 13. Although not particularly limited to, when the access level specify bit ALV is "0", a state in which the RAM is accessible as indicated; whereas when the bit ALV contains "1", it is indicated that the RAM is not accessible.

In the memory control circuit 12, there is provided a decoder for decoding an address outputted from the CPU onto the address bus 21 so as to select one of the control registers $RCR_1$ to $RCR_n$. The system is configured such that a bit of a specified control register can be set via the data bus 22. In addition, according to this embodiment, successive addresses are assigned to the registers $RCR_1$ and $RCR_n$ in order that these registers may be easily reallocated in the address space by use of the I/O base register IBR.

In consequence, in the microprocessor of this embodiment, when the access level specify bit ALV in the control register $RCR_1$, is set to "1" and the bit S/U of the status register in the CPU is "0" indicating the user state, an address in the address space of the integrated RAM 11 is outputted to the address bus 21, and when the coincidence signal C at a high level is delivered from the address compare circuit 17, the output from the AND gate $G_1$ is set to the high level. As a result, the output of the AND gate $G_2$, where the input is a signal obtained by inverting the state signal of the bit S/U, is changed to the high level. The output signal is supplied to an access violation signal AV to the exception processing circuit 8 of the CPU.

As a result, the CPU recognizes that the integrated RAM is invalidly accessed and then controls the microaddress generate circuit 4 to call, for example, a trap routine from the micro ROM 1 or passing control to an associated exception processing, for example, thereby reading from an external memory a program to restore the data in the vector address method and to return to the state prior to the access. If the microprocessor possesses an integrated ROM, the program to restore the data may be stored in the integrated ROM.

Incidentally, the exception processing circuit 8 is configured so as to be supplied with a signal from the bit S/U in the status register SR for indicating the supervisor/user state such that an exception processing for a privilege violation other than that described above can also be executed.

In this fashion, in the embodiment above, the state of the status signal of the access level specify bit ALV of the control register $RCR_1$ and that of the signal of the bit S/U in the status register SR for indicating the supervisor/user state, determine whether or not the integrated RAM 11 is accessible and is discriminated so as to generate an access violation signal.

Table 1 shows the accessibility of the integrated RAM in the case above.

TABLE 1

| Access level of | CPU execution state (S/U bit) | |
|---|---|---|
| integrated RAM | User state | Supervisor state |
| User level allowed | * | * |
| User level not allowed | x | * |

\*: Accessible
x: Not accessible

In consequence, when it is desired that the CPU uses the integrated RAM in the supervisor state and keeps the data therein, "1" need only be set to the access level specify bit ALV in the control register RCR before the mode is changed to the user state. As a result of this operation, when the integrated RAM is used in the user state, a condition that the RAM is invalidly accessed can be recognized. On the other hand, when the data in the integrated RAM is unnecessary, only by setting the access level specify bit ALV to "0" can the integrated RAM be freely used in the user state. This enables the integrated RAM, even if the capacity thereof is small, to be effectively used. However, in place of the operation to supply the access violation signal AV to the microaddress generate circuit 4, a bit may be disposed to indicate whether or not a violation exists in a register of the group 7 of control registers of the CPU so as to set "1" to the pertinent register.

Incidentally, such as the address setting register 16, there may be disposed a register specifying a partial area of the integrated RAM 11, in addition to the address designation of an address space of the integrated RAM 11. As a result, access can be inhibited in the user state to only the area used in a case where the area to be used in the supervisor state is a portion of the integrated RAM 11. According to the embodiment above, although the access level specify bit ALV is located in the control register RCR of the control circuit 12, the present invention is not limited to that embodiment; namely, a flag or a register dedicated for the purpose of access inhibition may be provided.

The register may be positioned at an outside or inside location with respect to the CPU; furthermore, a free bit of a status register or a control register in the CPU may also be used.

Moreover, by configuring the register with the access level specify bit such that the register can be set to the reset or set state in response to a reset signal R, an invalid access to the integrated RAM attempted prior to an initialization and immediately after the power is turned on can be prevented.

Figure 2:
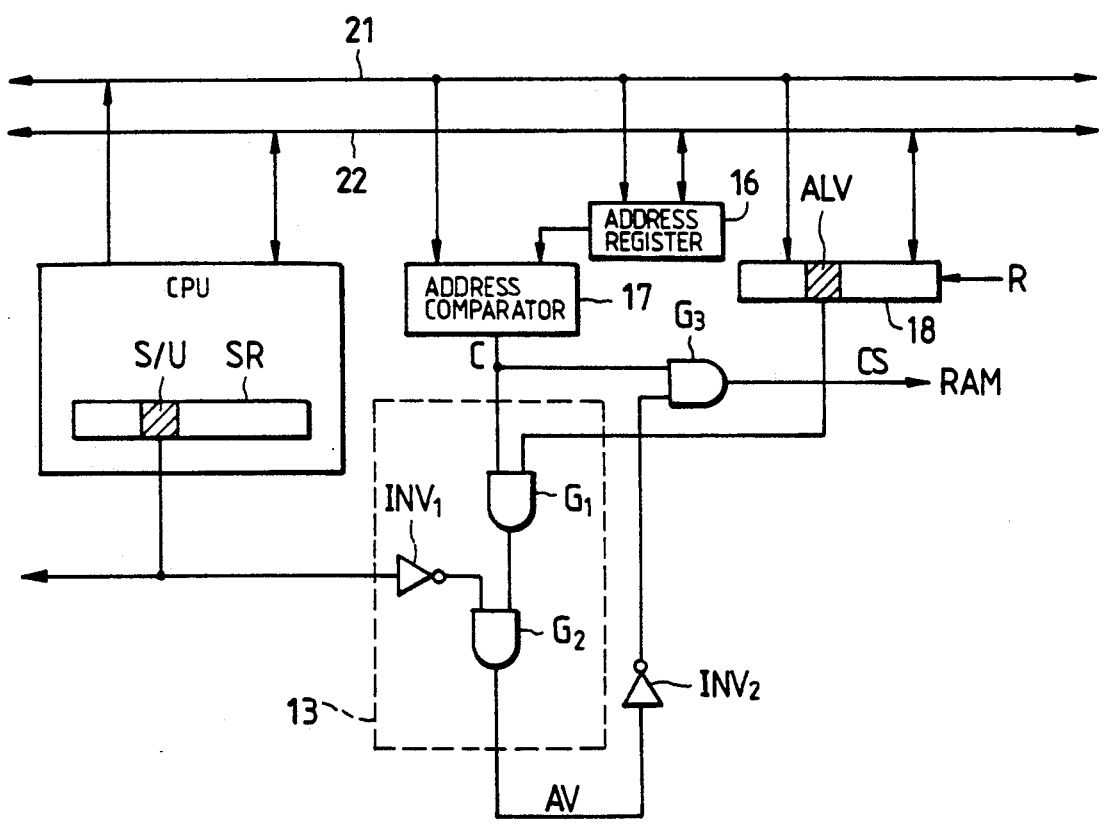
FIG. 2 is a block diagram schematically showing a second embodiment in a case where the present invention is applied to a microprocessor.

FIG. 2 shows the second embodiment of a microprocessor according to the present invention.

In the microprocessor of this embodiment there is disposed a new register 18 having the access level specify bit ALV; in addition, by using the access violation signal AV outputted from the access level judge circuit 13 configured in the same fashion as that of the embodiment of FIG. 1, the selection signal CS supplied to the integrated RAM 11 is forcibly negated so as to inhibit the access itself to the RAM 11.

That is, there is disposed an AND gate $G_3$ of which the input signals include the address coincidence signal C delivered from the address compare circuit 17 and a signal attained by inverting through an invertor $INV_2$ the access violation signal AV outputted from the access level judge circuit 13 such that an output from this gate $G_3$ is supplied as a selection signal CS to the integrated RAM 11.

In consequence, according to this embodiment, if "1" is set to the ALV bit of the control register 18, even when an address in the address space of the RAM 11 is outputted to the address bus 21, an access to the integrated RAM 11 is not accomplished. As a result, the data in the RAM 1 used in the supervisor state can be protected.

Figure 3:
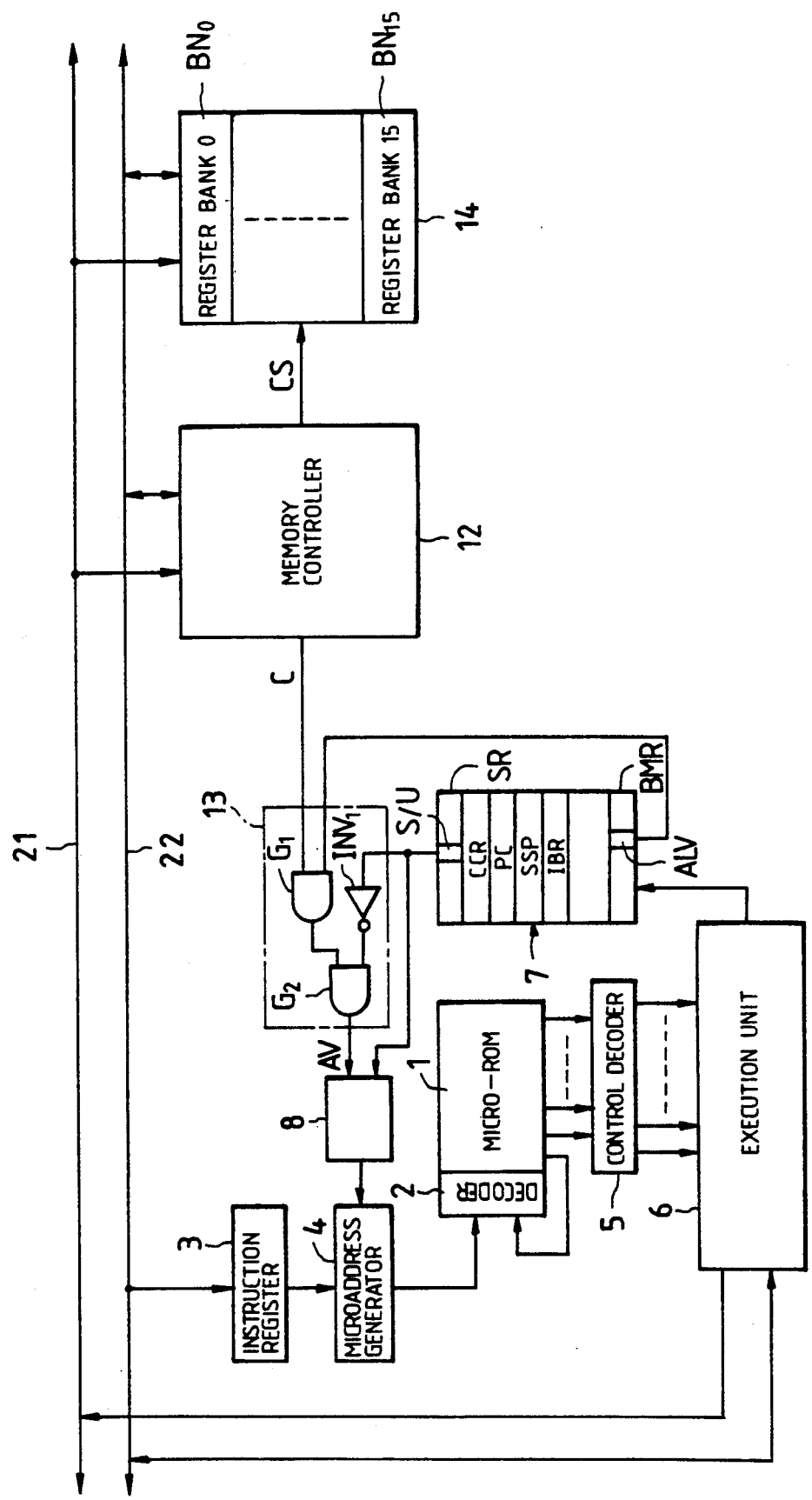
FIG. 3 is a block diagram schematically showing the third embodiment in a case where the present invention is applied to the microprocessor.

FIG. 3 shows the third embodiment of a microprocessor according to the present invention.

In the embodiment above, description has been given of a case where the integrated RAM assigned as a work area of the CPU cannot be used in the user state; whereas, in this third embodiment, in a case where a register bank employed in a multitask processing comprises the RAM, the register bank is set so as to be used or not to be used in the user state. That is, a group 14 of general-purpose registers comprising the RAM possesses 16 register banks $BN_0$ to $BN_{15}$, each including 16 registers, and there is disposed a register bank number specify bit for specifying one of the register banks $BN_0$ to $BN_{15}$ and a bank mode register BMR supervising a change-over bit and the like of the register banks as one of the control registers in the register group 7. Moreover, a bit of the bank mode register BMR is employed as the access level specify bit ALV such that the state signal of this bit ALV is inputted to the AND gate $G_1$ of the access level judge circuit 13 configured in the same fashion as that of the embodiment of FIG. 1.

In addition, according to this embodiment, the address setting register 16 and the address compare circuit 17 of the embodiment of FIG. 1 are located in the memory control circuit 12 effecting the selection control of the general-purpose register group 14 and the control register group 7. When the address on the address bus 21 is within the address range of the general purpose register group 14, coincidence detection signal C is to be supplied from the memory control circuit 12 and the AND gate $G_1$ of the access level judge circuit 13. Moreover, in this embodiment, if an address coincidence is detected when the ALV bit is "1", the selection signal CS for selecting the RAM constituting the register group 14 is not to be changed to the selection level.

As a result, in this embodiment, by setting "1" to the access level specify bit ALV in the bank mode register BMR by use of a dedicated instruction, an access to a register bank used in the supervisor state can be inhibited in the user state, thereby smoothly and safely effecting the change-over of the multitask processing.

Figure 4:
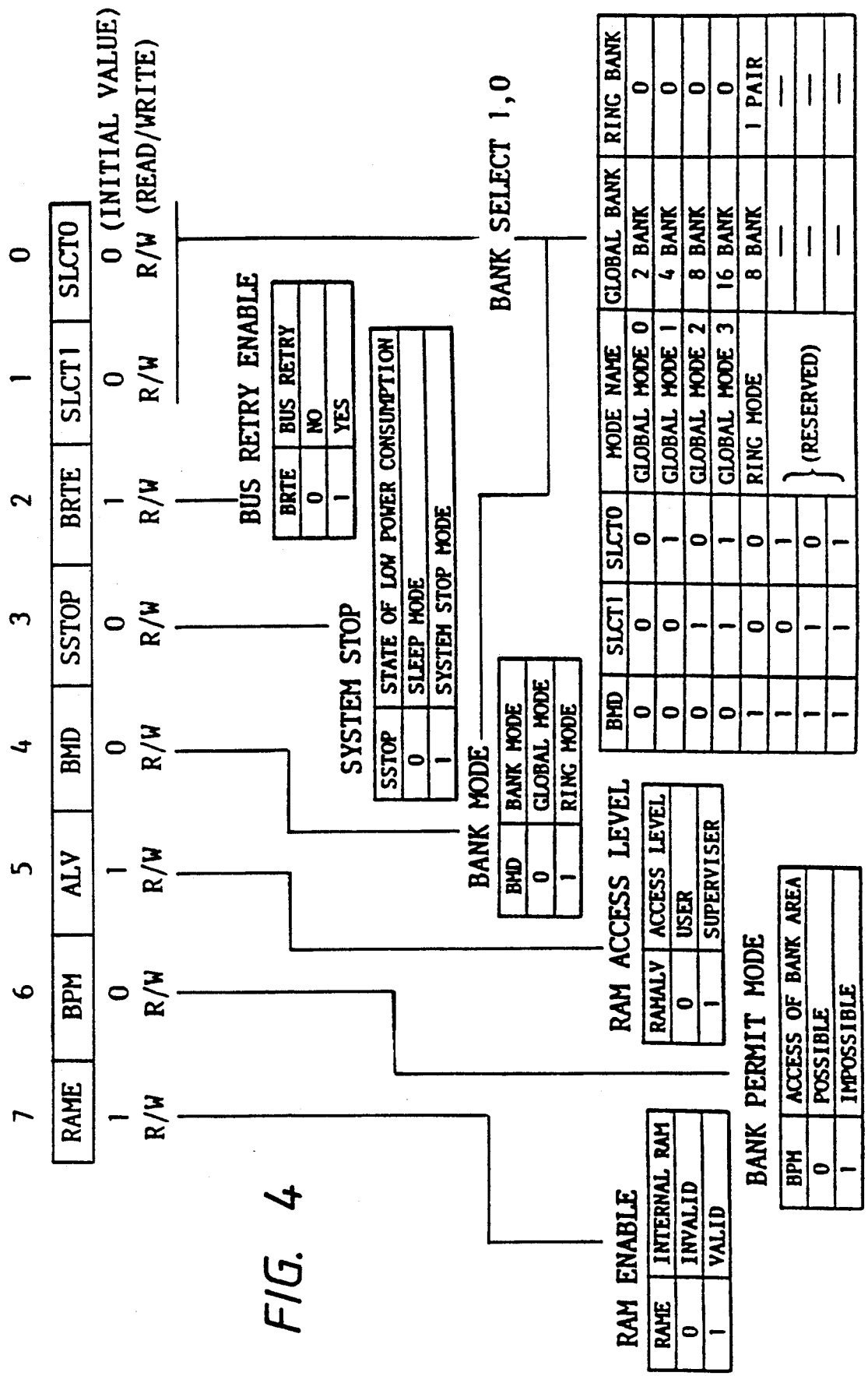
FIG. 4 is a configuration diagram showing a bit configuration example of a bank mode register including an access level specify bit of the integrated RAM.

FIG. 4 shows a configuration example of the bank mode register provided with an access level specify bit associate with the RAM.

The bank mode register BMR of this embodiment includes eight bits comprising a RAM enable control bit RAME, a bank permit mode specify bit BPM, an internal RAM access level specify bit ALV according to the present invention, a bank mode specify bit BMD, a system stop mode specify bit SSTOP, a bus retry enable control bit BRTE, and bank select bits SLCT 1 and SLCT0.

Among these bits, when the RAM enable control bit RAME is set to "1", the integrated RAM is enabled to be effective; whereas, when RAME is cleared to "0", the integrated RAM as a memory is set to be ineffective. In this situation, if an access is issued to a data area of the integrated RAM by use of an address thereof, the same address of an external device is to be accessed.

In addition, the bank permit mode specify bit BPM is disposed to determine whether or not a portion of the integrated RAM associated with the register bank area of the CPU can be accessed as a memory. When the bit BPM is set to "1", this area above can be accessed as a memory; whereas, when the bit BPM is cleared to "0", the area cannot be accessed as a memory. When a read operation is accomplished on this area in a case of BPM-0, all bits are attained as undefined bits; whereas, even when a write operation is attempted thereon, the RAM is not influenced with the write operation and the value stored therein is kept unchanged.

Incidentally, the bit BPM is effective when "1" is set to the bit RAME. If the bit RAME is cleared to "0", an external device is accessed regardless of whether the bit BPM is "1" or "0"

The system stop mode specify bit SSTOP is used to select a low consumption power state of the CPU when a particular instruction called a SLEEP is executed. If a SLEEP instruction is executed when the bit SSTOP is "0", the system enters the sleep mode in which only the operation of the CPU is stopped with the operations of the peripheral devices remaining unchanged. On the other hand, if the SLEEP instruction is executed when the bit SSTOP is set to "1", the system is set to the system stop mode in which the operations of the CPU and peripheral devices except the refresh controller of the integrated RAM are stopped. Incidentally, in the sleep mode, the CPU is initiated again only in response to an interruption from a peripheral device or an external device; whereas, in the system mode, the CPU is reactivated only in response to an external interruption.

The bus retry enable control bit BRTE is employed to specify a countermeasure procedure to be effected when a bus error takes place. When the bit BRTE is cleared to "0", the system enters the bus error mode in which the bus error exception processing sequence is achieved; whereas, when the bit BRTE is set to "1", the bus retry mode is set so as to effect the same bus cycle again.

In addition, the bank mode specify bit BMD is disposed to specify a utilization of the register banks of the integrated RAM together with the bank select bits SLCT1 and SLCT0. When the bit BMD is cleared to "0", the system enters the global mode in which only one of a plurality of register banks can be used; whereas when the bit BMD is set to "1", one half of the integrated RAM is used as eight global banks and the remaining half thereof is employed such that the RAM provides an infinite number of successive banks. Incidentally, in any mode above, for the global banks, the bank number register can be rewritten by use of a dedicated bank switch instruction when an interruption takes place, thereby effecting switching or changeover operation between global banks.

Furthermore, the bank selects bits SLCT1 and SLCT0 can be used to change the configuration of the banks according to the combination of SLCT1 and SLCT0 in the global mode in which the bank mode specify bit BMD is "0". That is, when SLCT1 and SLCT0 are "0, 0"; "0, 1"; "1, 0"; and, "1, 1"; there are established the 2-bank, 4-bank, 8-bank, and 16-bank configurations, respectively.

Incidentally, as in the case of the embodiment of FIG. 1, the access violation signal AV outputted from the access level judge circuit 13 may be supplied to the CPU 1 to notify the access level violation to the CPU1, thereby effecting the restoration thereof and the countermeasurement processing.

Furthermore, according to the embodiment above, in a case where an access violation is detected, the condition is notified to the CPU so as to return to the original state through an exception processing or an access to the integrated RAM itself is inhibited; however, there may be disposed an access inhibit bit in the control register RCR$_1$, the control register 18, or other register such that whether the access to the RAM is inhibited or the data is to be restored after the invalid access can be selected when an access violation takes place. In addition, it is also possible in this situation to dispose a read/write specify bit such that a read access is allowed and only a write access is inhibited depending on the setting of the read/write specify bit.

In addition, in a case where there is configured a microprocessor not having a function in which the allocation address of the integrated RAM 11 can be freely reallocated in the address space possessed by the microprocessor, the address compare circuit 17 can be replaced with a decode circuit having a relatively simple circuit configuration. The address compare circuit 17 compares the address on the address bus 21 with the allocation address of the integrated RAM 11 and is hence completely operable even if the allocation address is fixed, the same function can be possessed with a decode circuit having a smaller circuit size.

Incidentally, according to the embodiment above, there is disposed a register or a flag to which the access level of the integrated RAM is set so as to enable the control to be effected by means of the program; however, for example if there is a margin in the number of pins of the microprocessor, there may be disposed a terminal to set the access level from an external device, thereby enabling the hardware control to be achieved by the external circuit.

In addition, with reference to the embodiment above, description has been given of a prevention of the data destruction in the integrated RAM; however, the protection of secrecy of the ROM data can be effected by applying the present invention to a read only memory (ROM), integrated in the microprocessor, a programmable ROM (PROM), an erasable PROM (EPROM) of which data is erasable by means of an ultraviolet ray, an electrically erasable EPPROM (EEPROM) of which data is electrically writable and erasable, and the like.

In addition, the RAM as an object of the control above need not be limited to the integrated RAM, namely an external RAM is also applicable.

Moreover, in place of the provision of the access level specify bit ALV in the control register, the bit may be disposed as a flag.

According to the present invention, there are attained the following effects.

There is disposed a flag or a register to indicate whether or not a RAM area used by the CPU in the supervisor state can be used in the user state. Also disposed is a judge circuit for determining based on the content of the flag or register and also based on the supervisor/user state indication bit of the status register whether or not the CPU has attempted an invalid access to the RAM in the user state. When an access violation occurs, a violation signal is set to the CPU and a selection signal of the RAM is negated (is set to the invalid state). Consequently, in a case where the CPU uses the RAM in the supervisor state and the data is desired to be kept therein, by setting a state inhibiting the access to the new flag or register thus disposed, an access to the corresponding RAM in the user state is automatically inhibited. Through this operation, destruction or a read out operation of important data can be prevented and the data destroyed by an exception processing or the like can be restored. This leads to an effect that the reliability of the system is greatly improved.

A concrete description has been given of the invention accomplished by the present inventor with reference to the embodiments; however, the present invention is not limited by those embodiments. It is to be appreciated that the embodiments can be changed and modified without departing from the scope and spirit of the present invention. For example, in the embodiments above, there is disposed a register or flag indicating the access level of the RAM such that depending on the state thereof, the integrated RAM can be used only in the supervisor state or in the supervisor and user states; however, there may be disposed two integrated RAMs each having the same address space such that depending on the content of the register designating the access level, either one of the RAMs is set to be accessible so as to prevent an access in the user state to the RAM used in the supervisor state, thereby protecting the data in the RAM. However, when the integrated RAM is shared between the supervisor and user states like in the case of the embodiment, a higher utilization rate of the memory is developed.

In addition, according to the embodiment above, when an access violation with respect to the integrated RAM is detected, the access is inhibited or a restoration of the data is effected; however, the present invention is also applicable to a case where the CPU simply wants to know whether or not the user has referenced the integrated RAM.

Furthermore, although the description has been given of a memory access violation and the countermeasurement processing thereof in conjunction with the embodiment, the present invention is also applicable to a case where the access in the user state is to be inhibited with respect to the peripheral I/O devices other than the memory, for example, a particular I/O port.

The description above is associated with cases where the invention primarily accomplished by the present inventor is applied to a microprocessor as a utilization field as the background of the invention; however, the present invention is not restricted by those cases, but can be utilized in a single-chip microcomputer comprising a timer, a serial communication circuit, DMA controller, and the like disposed on the same chip, a microcomputer of a board type, and a general data processor having a function associated with a data access.

What is claimed is:

1. A microcomputer formed on a single semiconductor chip comprising a central processing unit which operates in either a supervisor mode which is permitted to execute all instructions of the microcomputer or a user mode which is limited in the instructions it is permitted to execute, and which includes a status register having a bit for indicating the mode in which the central processing unit is operating, the microcomputer comprising:

memory means for storing data; and
   a register having a bit for indicating whether the central processing unit can access the memory means in the user mode, the bit of the register being rewriteable by the central processing unit, when the central processing unit operates in the supervisor mode,
   wherein the central processing unit is restricted from accessing the memory means when the bit of the status register indicates that the central processing unit is operating in the user mode, and the bit of the register indicates that the central processing unit is restricted from using the memory means in the user mode and wherein the central processing unit accesses the memory means regardless of the bit of the register when the bit of the status register indicates that the central processing unit is operating in the supervisor mode.

2. The microcomputer in accordance with claim 1 further including a microprocessor in which said status register is disposed.

3. The microcomputer in accordance with claim 2, further comprising access level judge means for judging whether access is to be made to the memory in accordance with the bits of the status register and the register,
   wherein the access level judge means provides a signal to the central processing indicating that the central processing unit cannot access the memory when the bit of the status register is indicating that the central processing unit is operating in the user mode and the bit of the register is indicating that the central processing unit cannot use the RAM module in the user mode.

4. A microcomputer formed on a single semiconductor chip comprising a central processing unit which operates in either a supervisor mode in which all given instructions and internal registers of the microcomputer can be used or a user mode in which particular instructions and internal registers cannot be used such that a state register disposed int he central processing unit reflects an operation state thereof, wherein the state register has a bit for indicating one of the supervisor mode and the user mode, the microcomputer comprising:

a register having a bit for indicating whether the central processing unit can access a memory in the user mode, the bit of the register being rewriteable by the central processing unit, when the central processing unit operates in the supervisor mode,
   wherein the central processing unit executes a process to return to the operation state prior to access of the memory, if the memory is accessed by the central processing unit when the bit of the state register is indicating that the central processing unit is operating in the user mode and the bit of the register is indicating that the central processing unit is restricted from use of the memory in the user mode.

5. The microcomputer in accordance with claim 4 wherein said register is configured so as the bit of said register is set to indicate whether the central processing unit can access the memory while in the user mode, through an instruction available only in said supervisor mode.

6. The microcomputer in accordance with claim 4 further including:
   an address register for allocating address space to the memory.

7. The microcomputer in accordance with claim 6 further comprising:
   a comparator means for comparing an address of the address register and an address located on an address bus of the microcomputer; and
   an outputting means for outputting a resultant signal of the comparison.

8. The microcomputer in accordance with claim 7, further comprising access level judge means for judging, in accordance with contents of the bits of the state register and the register, whether to return to an operation state existing prior to an access of the memory,
   wherein the access level judge means provides a signal for the central processing unit to execute a process to return to the operation state existing prior to the access of the memory when the bit of the state register indicates the central processing unit is operating in the user mode and the bit of the register indicates that the central processing unit is restricted from use of the memory in the user mode.

9. The microcomputer in accordance with claim 8 wherein when the signal indicating the central processing unit is restricted from access to the memory is outputted from said access level judge means, a selection signal of said memory is set to an invalid state.

10. The microcomputer in accordance with claim 8 wherein when the signal indicating that the central processing unit cannot access the memory is outputted, by said access level judge means, a selection signal of said memory is set to an invalid state.

11. The microcomputer in accordance with claim 1, further comprising access level judge means for judging whether a return to an operation state prior to access of the memory in accordance with contents of the bits of the state register and the register and the resultant signal of the comparator means,
   wherein the access level judge means provides a signal for the central processing unit to execute a process to return to the operation state existing prior to access of the memory, when the status register indicates the central processing unit is operating in the user mode, the bit of the register indicates the central processing unit is restricted from use of the memory in the user mode, and the comparator means outputs a signal which indicates the address of the address register and the address located on the address bus coincide.

12. The microcomputer in accordance with claim 4 wherein said memory is a RAM.

13. The microcomputer in accordance with claim 12 wherein said RAM is a memory constituting a group of general registers of said central processing unit.

14. The microcomputer in accordance with claim 12 further including a control register in said central processing unit for controlling a utilization of register banks in said RAM, said register having a bit for specifying an access level of said RAM.

15. A microcontroller unit formed on a single semiconductor chip comprising a central processing unit which operates in one of a supervisor mode in which all given instructions and internal registers of the central processing unit can be used and a user mode in which particular instructions and internal registers cannot be used and which includes a status register having a bit for indicating that the central processing unit is operating in one of the supervisor mode and the user mode, the microcontroller unit comprising:

a RAM module for storing data;
a register having a bit, which has a first state and a second state, which is determined by the central processing unit operating in the supervisor mode where the first state enables an access of the RAM module by the central processing unit operating in the user mode, and the second state disenables an access of the RAM module by the central processing unit operating in the user mode; and,
inhibit means for inhibiting an access of the central processing unit to the RAM module when the bit of the status register indicates that the central processing unit is operating in the user mode and the bit of the register indicates the second state.

16. In a single chip microcomputer formed on a single chip, including a central processing unit which includes a status register having a bit for designating one of a supervisor mode and a user mode and which operates in the mode designated by the bit of said status register, wherein when in said supervisor mode said central processing unit executes a particular instruction the execution of which is prevented in said user mode, said single chip microcomputer comprising:

an internal memory formed on said single ship;
a control register having a bit for indicating whether accessing of said internal memory by said central processing unit while in said user mode is permitted, the bit of the control register being rewriteable by the central processing unit, when the central processing unit operates in the supervisor mode; and,
access control means responsive to the bit of said control register for overriding said restriction on access of said internal memory by said central processing unit in said user mode if the bit of said control register represents permitting said central processing unit in said supervisor mode to access said internal memory.

17. The single chip microcomputer according to claim 16, wherein said access control means includes judging means coupled to said status register and to said control register for judging whether accessing of said internal memory by said central processing unit is to be overrided on the basis of both the bit of said status register and the bit of said control register.

18. The single chip microcomputer according to claim 17, wherein said single chip microcomputer further comprises address defining means for allocating a predetermined address to said internal memory, wherein said central processing unit further comprises address signal generating means for generating address signals, and wherein said access control means further comprises comparing means for comparing said predetermined address with address signals generated by said address signal generating means to judge whether or not said internal memory is accessed by said central processing unit.

19. In a microcomputer formed on a single chip, including a central processing unit which includes a status register having a bit for designating one of a supervisor mode and a user mode and which operates in the mode designated by the bit of said status register, wherein when in said supervisor mode said central processing unit executes a particular instruction the execution of which is prevented in said user mode, said single chip microcomputer comprising:

an internal memory formed on said single chip;
a control register having a bit for indicating an attribute of said internal memory, the bit of the control register being rewriteable by the central processing unit, when the central processing unit operates in the supervisor mode; and,
access control means responsive to the bit of said control register for inhibiting access to said internal memory by said central processing unit when it is in said user mode when the bit of said control register represents said supervisor mode.

20. The single chip microcomputer according to claim 19, wherein said access control means includes judging means coupled to said status register and to said control register for judging whether accessing of said internal memory by said central processing unit is to be inhibited on the basis of both the bit of said status register and the bit of said control register.

21. The single chip microcomputer according to claim 20, wherein said single chip microcomputer further comprises address defining means for allocating a predetermined address to said internal memory, wherein said central processing unit further comprises address signal generating means for generating address signals, and wherein said access control means further comprises comparing means for comparing said predetermined address with address signals generated by said address signal generating means to judge whether or not said internal memory is accessed by said central processing unit.

22. The single chip microcomputer according to claim 19 wherein the internal memory includes a RAM.

23. The single chip microcomputer according to claim 22 further including an array base address register, wherein the array base address register controls placement location of the RAM within the internal memory, the placement location allowing one of, access to RAM only when the central processing unit is in supervisory mode and access to RAM when the central processing unit is in supervisory or user mode.

24. A microcontroller unit formed on a single semiconductor chip comprising a central processing unit which operates at one of a supervisor mode in which all given instructions and internal registers can be used and user mode in which particular instructions and internal registers cannot be used and which includes a status register having a bit for indicating that the central processing unit is operating in one mode of the supervisor mode and the user mode, the microcontroller unit comprising:

a RAM module for storing data;

a register having a bit for designating whether the central processing unit can be used by the RAM module in the user mode, wherein the central processing unit can access the register when the central processing unit operates in the supervisor mode; and, ignore means for ignoring an access of the central processing unit for the RAM module when the bit of the status register is indicating that the central processing unit is operating in the user mode and the bit of the register is indicating that the central processing unit cannot use the RAM module in the user mode.

25. In a single chip microcomputer formed on a single chip, comprising a central processing unit which includes a status register having a bit for designating one mode of supervisor and user modes and which operates in the mode designated by the bit of said status register, wherein said supervisor mode allows said central processing unit to execute a particular instruction of which the execution is prevented in said user mode, said single chip microcomputer comprising:

an internal memory formed on said single chip;

a control register having a bit for indicating whether or not accessing to said internal memory by said central processing unit in said user mode is permitted, the bit of the control register being rewriteable by the central processing unit, when the central processing unit operates in the supervisor mode; and, access control means responsive to the bit of said control register for ignoring accessing for said internal memory by said central processing unit in said user mode if the bit of said control register represents permitting said central processing unit in said supervisor mode to access said internal memory.

26. The single chip microcomputer according to claim 25, wherein said access control means includes judging means coupled to said status register and to said control register for judging whether or not accessing for said internal memory by said central processing unit is to be ignored on the basis of both the bit of said status register and the bit of said control register.

27. The single chip microcomputer according to claim 26, wherein said single chip microcomputer further comprises address defining means for allocating a predetermined address to said internal memory, wherein said central processing unit further comprises address signal generating means for generating address signals, and wherein said access control means further comprises comparing means for comparing said predetermined address with address signals generated by said address signal generating means to judge whether or not said internal memory is accessed by said central processing unit.

28. In a single chip microcomputer formed on a single chip, comprising a central processing unit which includes a status register having a bit for designating one mode of supervisor and user modes and which operates in the mode designated by the bit of said status register, wherein said supervisor mode allows said central processing unit to execute a particular instruction of which the execution is prevented in said user mode, said single chip microcomputer comprising:

an internal memory formed on said single chip;

a control register having a bit for indicating an attribute of said internal memory, the bit of the control register being rewriteable by the central processing unit, when the central processing unit operates in the supervisor mode; and, access control means responsive to the bit of said control register for ignoring accessing for said internal memory by said central processing unit in said user mode if the bit of said control register represents said supervisor mode.

29. The single chip microcomputer according to claim 28, wherein said access control means includes judging means coupled to said status register and to said control register for judging whether or not accessing for said internal memory by said central processing unit is to be ignored on the basis of both the bit of said status register and the bit of said control register.

30. The single chip microcomputer according to claim 29, wherein said single chip microcomputer further comprises address defining means for allocating a predetermined address to said internal memory, wherein said central processing unit further comprises address signal generating means or generating address signals, and wherein said access control means further comprises comparing means for comparing said predetermined address with address signals generated by said address signal generating means to judge whether or not said internal memory is accessed by said central processing unit.

* * * * *

UNITED STATES PATENT AND TRADEMARK OFFICE
CERTIFICATE OF CORRECTION

PATENT NO. : 5,305,460
DATED : April 19, 1994
INVENTOR(S) : Susumu Kaneko, et al.

It is certified that error appears in the above-indentified patent and that said Letters Patent is hereby corrected as shown below:

Claim 3, column 9, line 53, after "processing" insert --unit--.

Claim 4, column 9, line 66, delete "int he" and substitute therefor --in the--.

Claim 16, column 11, line 50, delete "ship" and substitute therefor --chip--.

Claim 30, column 14, line 45, delete "or" and substitute therefor --for--.

Signed and Sealed this

Twenty-sixth Day of July, 1994

Attest:

BRUCE LEHMAN

*Attesting Officer*    *Commissioner of Patents and Trademarks*